Inventors
Keith F. Gallimore
George Langen

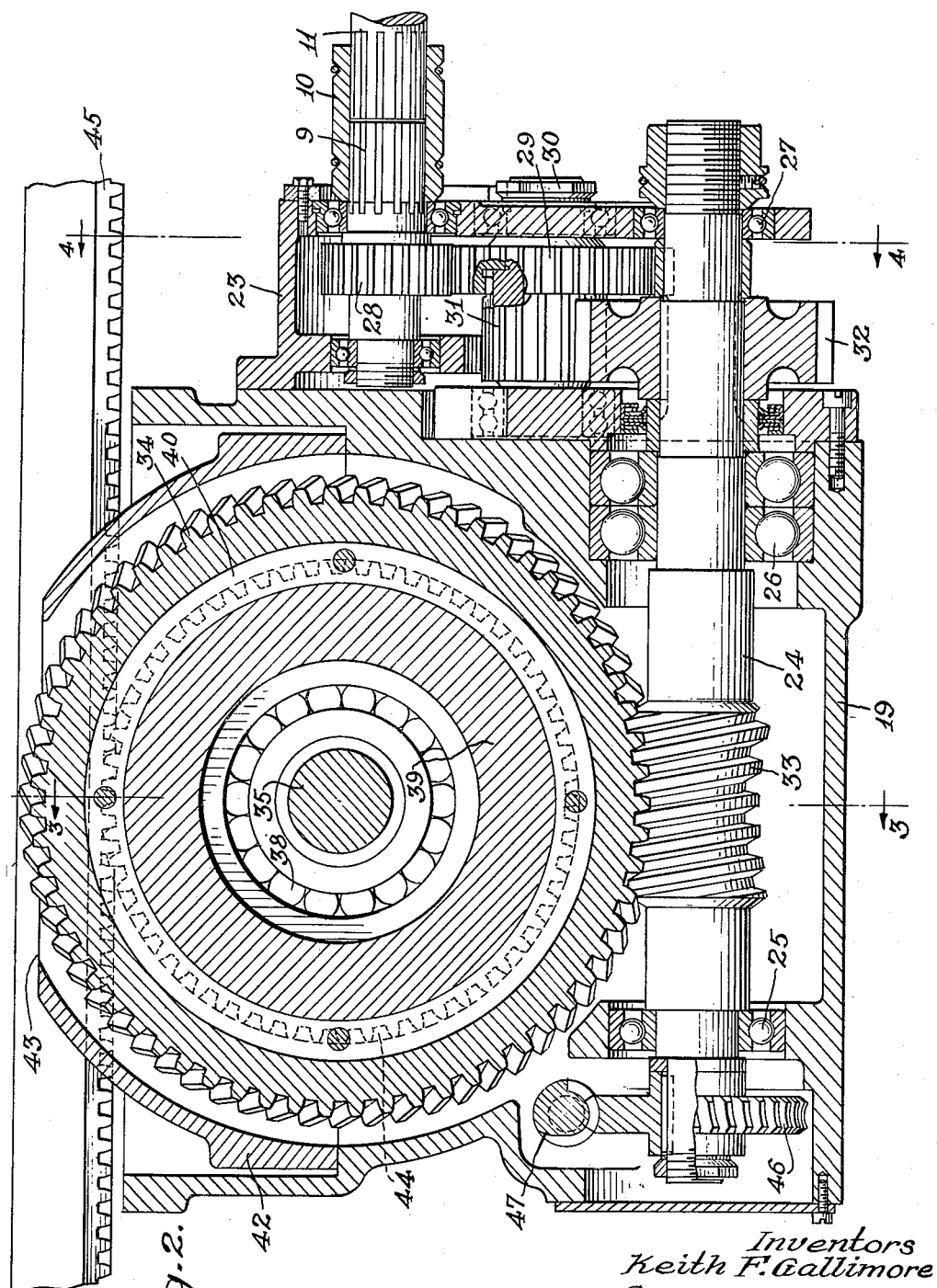

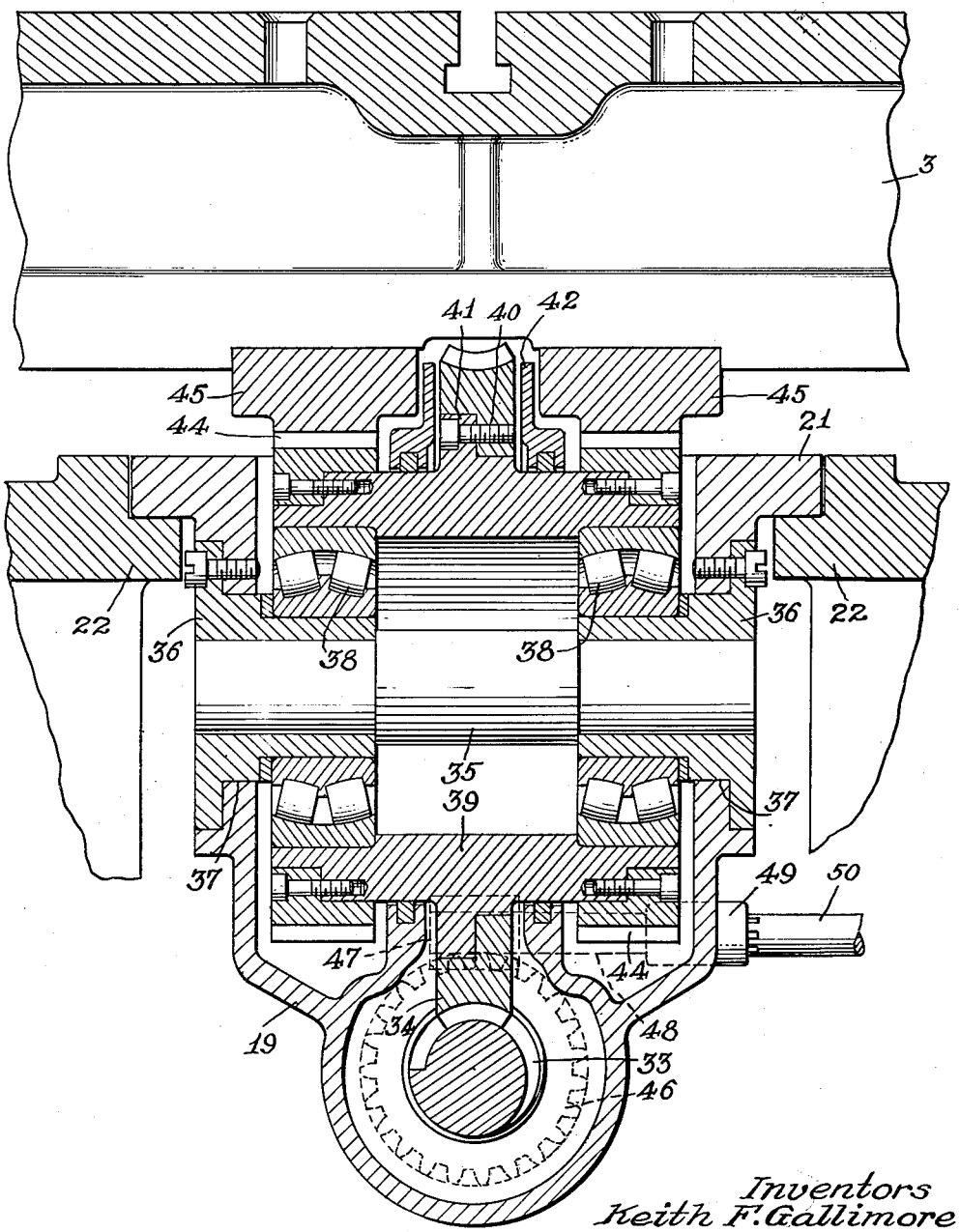

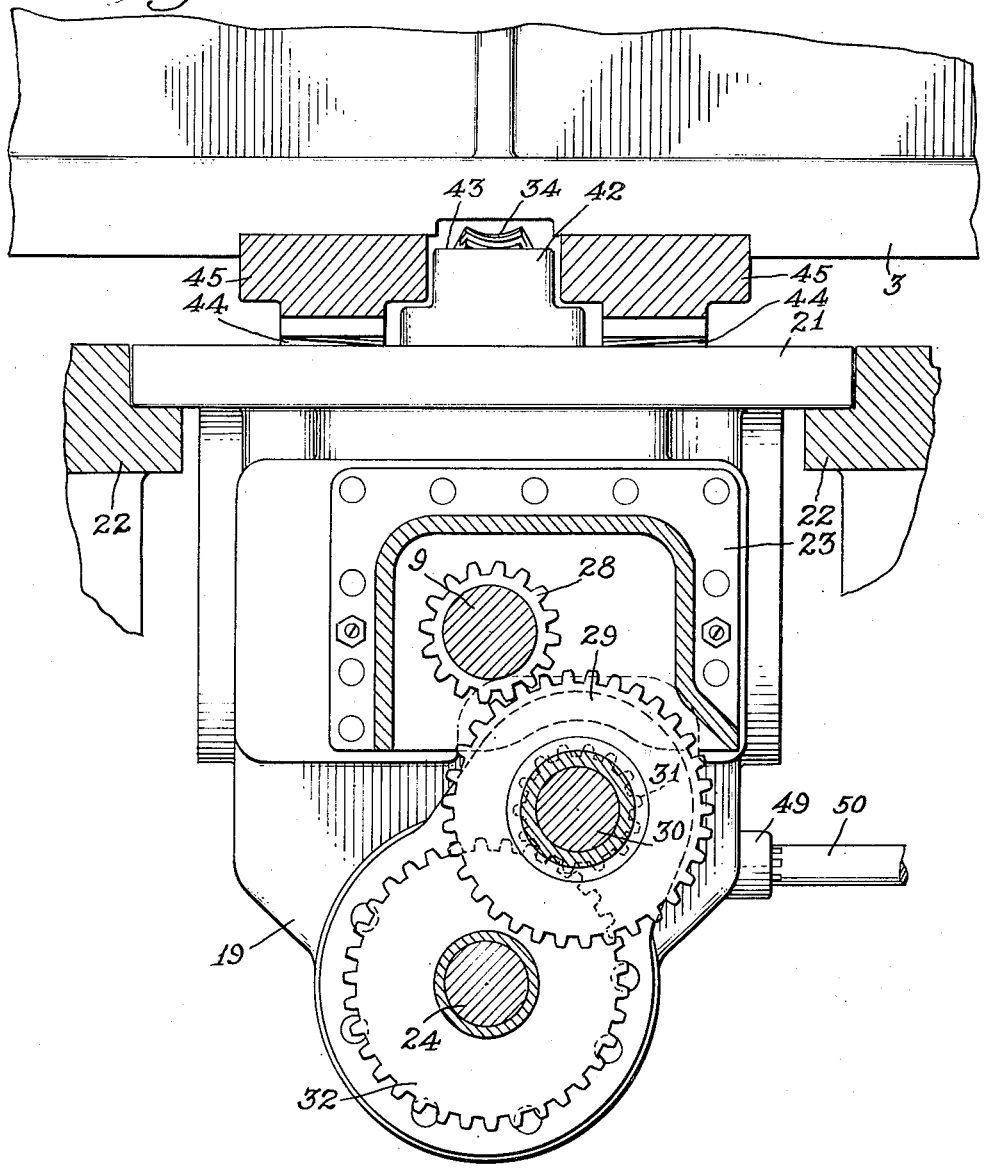

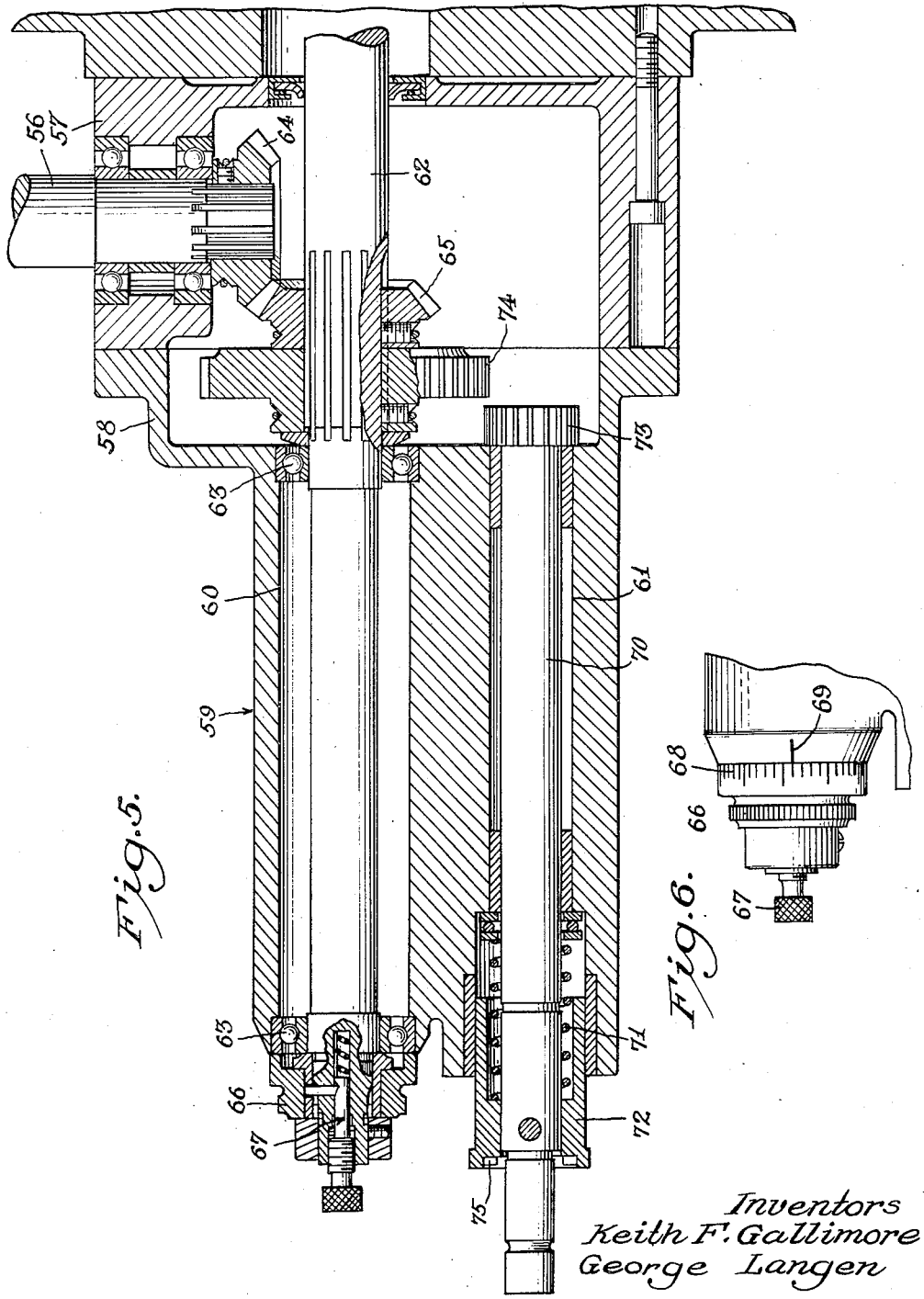

Patented Mar. 7, 1944

2,343,503

UNITED STATES PATENT OFFICE 2,343,503

TABLE DRIVE FOR MACHINE TOOLS

Keith F. Gallimore, Fond du Lac, Wis., and George Langen, Cincinnati, Ohio, assignors of one-half to Giddings & Lewis Machine Tool Co., Fond du Lac, Wis., a corporation of Wisconsin Application February 11, 1942, Serial No. 430,376

13 Claims. (Cl. 90—37)

The present invention relates to improvements in table drives for machine tools, and has particular reference to a new and improved drive mechanism for translating large and heavy tables, such as the table of a horizontal boring, drilling and milling machine of the planer type.

One of the objects of the invention is to provide a novel table drive mechanism which is sturdy and powerful in operation to satisfy the heavy duty requirements imposed upon it, and which is subject to a minimum of wear in use.

Another object is to provide a new and improved drive mechanism for a table of the planer type which is adapted to be power operated, and which also includes novel means accessible from either side of the table for effecting manual operation.

A further object is to provide a novel drive mechanism for large tables which includes in the drive transmission a worm and worm wheel gearing having extensive tooth engagement capable of withstanding heavy loads, and a double rack and gear connection to the table capable of imparting a balanced thrust.

Other objects and advantages will become apparent as the description proceeds.

In the accompanying drawings,

Fig. 2 is an enlarged vertical sectional view of a table drive unit forming part of the drive mechanism, taken substantially along line 2—2 of Fig. 1.

Fig. 3 is an enlarged transverse vertical sectional view of the table drive unit taken along line 3—3 of Fig. 2.

Fig. 4 is another vertical sectional view taken substantially along line 4—4 of Fig. 2.

Fig. 5 is a fragmentary horizontal sectional view of manual means for actuating the table.

Fig. 6 is a fragmentary detail view of a micrometer for indicating the position of adjustment of the table.

Figure 1:
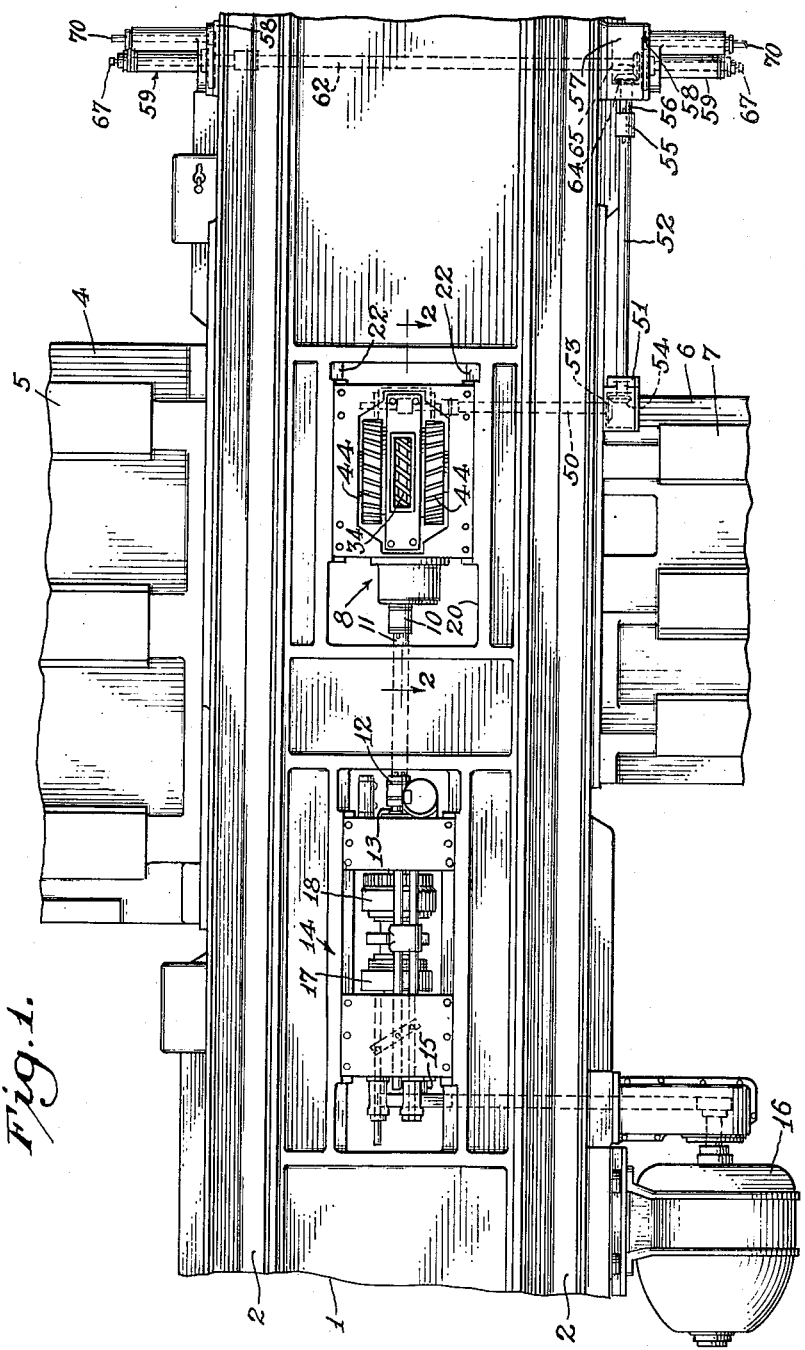
Figure 1 is a fragmentary plan view of the bed of a machine embodying the features of our invention, the machine table being removed to show the table drive mechanism.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

Referring more particularly to the drawings, the table drive mechanism constituting the exemplary embodiment of the invention may be utilized for tables or carriages in various types of machine tools, but is especially suited for and hence shown in connection with the table of a horizontal boring, milling and drilling machine of the planer type. In general, the machine comprises an elongated horizontal bed 1 having spaced parallel guideways 2 formed in the top and extending longitudinally thereof. A worktable 3 is supported on the guideways 2 for longitudinal reciprocation.

Secured to one side of the bed 1 substantially midway of its ends is a horizontal base 4 having guideways 5 for supporting a headstock column (not shown) for translation in a direction perpendicular to the table travel. A similar base 6 is secured to the other side of the bed 1, and has guideways 7 for supporting a tailstock column (not shown) for translation in a direction perpendicular to the table travel. It will be understood that a spindle head and a tailstock are normally mounted respectively on the columns for synchronous vertical translation. These elements are not show since per se they form no part of the present invention.

The table drive mechanism comprises a novel worm and worm wheel drive unit 8 of heavy duty characteristics which is mounted within the bed 1 midway of the ends and on the longitudinal center line, and which is operatively connected to the table 3 to translate the latter. The drive unit has a power inlet shaft 9 (Fig. 2) which is connected through a spline coupling 10 to an intermediate shaft 11, in turn connected through a spline coupling 12 to the outlet shaft 13 of a table feed unit 14.

The table feed unit 14 is mounted within the rear end of the bed 1 in substantial alinement with the drive unit 8, and has a power inlet shaft 15 connected to a reversible variable-speed electric drive motor 16 mounted on one side of the bed. The feed unit 14 includes a rapid traverse clutch 17 for connecting the shaft 15 to the shaft 13 to translate the table 3 at a high rate of speed, and a feed clutch 18 for connecting the shafts through a series of selective speed change gear mechanisms to translate the table at different feed rates. By superimposing changes in the speed of the electric motor 16 on the feed unit 14, the range and number of available speeds and feeds for the table 3 is considerably extended.

The table drive unit

The table drive unit 8 comprises a housing 19 which is suspended within a recess 20 in the bed 1. The housing is formed at the top with a marginal flange 21 resting on and bolted to spaced parallel longitudinal flanges 22 formed in the top of the bed at opposite sides of the recess 20. Removably bolted to one end of the housing 19 is a gear casing 23 in which the power inlet shaft 9 is suitably journaled. A worm shaft 24 extends longitudinally through the lower portion of the housing 19 and the casing 23, and is suitably journaled in spaced antifriction bearings 25, 26 and 27.

Fixed on the power inlet shaft 9 is a gear 28 meshing with a gear 29 on a parallel shaft 30 journaled in the casing 23. A second gear 31 on the shaft 30 meshes with a gear 32 on the worm shaft 24 to establish a reduction gear drive from the power inlet shaft 9 and the worm shaft.

A worm 33 is fixed on the shaft 24 between the bearings 25 and 26, and meshes with a worm wheel 34 mounted for rotation about a fixed shaft 35 extending through the housing 19. In the present instance, the opposite ends of the shaft 35 are reduced in diameter, and are supported in flanged sleeves 36 removably inserted in openings 37 in the opposite side walls of the housing 19. The sleeves are suitably bolted in position and project through the openings 38 into the housing 19. The inner raceways of two axially spaced roller bearings 38 are fitted respectively on the inner ends of the sleeves 36, and the outer raceways of the bearings are fitted into opposite ends of a tubular sleeve 39 constituting the hub of the worm wheel 34. In the present instance, the worm wheel 34 is annular in form, and has an inner peripheral flange 40 interfitting with and bolted to an outer peripheral flange 41 on the sleeve 39 intermediate the ends. A guard housing 42 of arcuate form is mounted in the upper portion of the body housing 19, and substantially encloses the upper half of the worm wheel 34, except for a clearance slot 43 in the top through which the upper gear teeth slightly project as shown in Fig. 2.

Two large drive gears 44 are rigidly bolted to the ends of the sleeve 39 at opposite sides of the worm wheel 34 for rotation therewith, and mesh respectively with two parallel longitudinal gear racks 45 secured to the underside of the table 3 to complete the table drive connection from the drive unit 8.

The worm 33 is of the hourglass type, and is formed to have substantially full tooth engagement throughout its length with the worm wheel 34 so as to afford a strong and durable drive. The two gears 44 meshing with the parallel gear racks 45 also afford a strong, durable and balanced drive connection between the worm wheel 34 and the table 3. Consequently, the table drive unit 8, although compact in size, is sturdy and powerful in action, and has load characteristics rendering it especially advantageous in translating large and heavy tables of the type commonly employed in horizontal boring, drilling and milling machines.

Provision is also made for operating the table 3 manually through the drive unit 8, and for indicating the extent of travel of the table. The manual drive means comprises a worm gear 46 fixed on one end of the worm shaft 24 outside of the bearing 25, and meshing with a worm 47 on a transverse shaft 48 journaled in the housing 19. The worm 47 has a long lead so that it can be driven from the gear 46. One end of the shaft 48 is connected through a spline coupling 49 to an alined shaft 50 which is journaled in the bed 1 and extends into a gear casing 51 on one side thereof. A longitudinal shaft 52, along a side of the bed 1, extends at one end into the gear casing 51 wherein it is connected through bevel gears 53 and 54 to the shaft 50. The other end of the longitudinal shaft 52 is connected through a spline coupling 55 to a stub shaft 56 journaled in and extending through one wall of a gear housing 57 (Figs. 1 and 5) on the side of the bed.

The outer end of the housing 57 is closed by a cover plate 58 having a projection 59 formed with two parallel bores 60 and 61. A similar housing 57 with a cover plate 58 is mounted on the other side of the bed 1 and the cover plate thereof has an extension 59 with bores 60 and 61 alined crosswise of the machine with the corresponding bores of the housing supporting the shaft 56. Extending transversely through the bed 1 is a cross shaft 62 which is rotatably supported adjacent opposite ends by means of bearings 63 mounted in opposite ends of the bores 60. The stub shaft 56 is connected through meshing bevel gears 64 and 65 to the shaft 62. Each end of the shaft 62 is provided with a micrometer dial 66 which is adapted to be secured in adjusted position by means of a clamp 67. The dial is formed with suitable graduations 68 (Fig. 6) which are associated with a zero point 69 on the beveled end of the projection 59. It will be understood that the dial 66 serves to indicate the extent of movement of the shaft 62 and hence, the extent of movement of the table. When desired, the clamp 67 may be released to permit adjustment of the dial 66 in relation to the zero point 69. Thereafter, the dial 66 may again be secured in position so that the continued movement of the table 3 may be accurately determined.

Extending through each bore 61 and suitably journaled therein is a manual actuating shaft 70 by means of which the table 3 may be driven through the unit 8 by manual operation upon adjustment of the clutches 17 and 18 into neutral position. The shaft 70 is axially slidable and is normally biased into its outermost position by means of a coiled compression spring 71 acting against a sleeve 72 pinned to the shaft. A gear 73, fixed on the inner end of the shaft 70, is movable into and out of meshing engagement with a gear 74 splined to the cross shaft 62. The outer end of the sleeve is formed with teeth 75 adapted for engagement by a hand crank (not shown) which may be slipped onto the outer end of the shaft 70. By forcing the shaft endwise against the action of the spring 71 to engage the gears 73 and 74, and then rotating the crank, the table will be translated manually. It will be evident that this may be accomplished from either side of the table.

We claim as our invention:

1. A drive mechanism for a table longitudinally translatable on a horizontal elongated bed comprising, in combination, a housing suspended in said bed substantially midway of its ends and on the longitudinal center line thereof, a worm wheel journaled in said housing for rotation on an axis extending transversely of said bed, a worm of hourglass shape journaled in said housing and meshing with the underside of said worm wheel, said worm being in substantially full tooth engagement with said worm wheel substantially throughout its length to afford a durable and powerful drive connection, two spaced parallel longitudinal gear racks rigid with the underside of said table and located at opposite sides of said worm wheel, two spaced gears connected coaxially to said worm wheel at opposite sides thereof for rotation therewith and meshing respectively with said gear racks, power means including a train of reduction gears mounted in said housing for rotating said worm, a transverse shaft drivingly connected with said worm and projecting from said bed at opposite sides of said table, and micrometer means associated with said transverse shaft for indicating the extent of travel of said table.

2. A drive mechanism for a table longitudinally translatable on a horizontal elongated bed comprising, in combination, a housing suspended in said bed substantially midway of its ends and on the longitudinal center line thereof, a worm wheel journaled in said housing for rotation on an axis extending transversely of said bed, a worm of hourglass shape journaled in said housing and meshing with the underside of said worm wheel, said worm being in substantially full tooth engagement with said worm wheel substantially throughout its length to afford a durable and powerful drive connection, two spaced parallel longitudinal gear racks rigid with the underside of said table and located at opposite sides of said worm wheel, two spaced gears connected coaxially to said worm wheel at opposite sides thereof for rotation therewith and meshing respectively with said gear racks, and means for rotating said worm.

3. A drive mechanism for a table longitudinally translatable on a horizontal elongated bed comprising, in combination, a housing mounted in said bed, a worm wheel journaled in said housing for rotation on an axis extending transversely of said bed, a worm of hourglass shape journaled in said housing and meshing with said worm wheel, said worm being in substantially full tooth engagement with said worm wheel throughout a major portion of its length to afford a durable and powerful drive connection, two spaced parallel longitudinal gear racks rigid with the underside of said table and located at opposite sides of said worm wheel, two spaced gears connected coaxially to said worm wheel at opposite sides thereof and meshing respectively with said gear racks, and power means including a train of reduction gears for rotating said worm.

4. A drive mechanism for a table longitudinally translatable on a horizontal elongated bed comprising, in combination, a housing mounted in said bed, a worm wheel journaled in said housing for rotation on an axis extending transversely of said bed, a worm of hourglass shape journaled in said housing and meshing with said worm wheel, said worm being in substantially full tooth engagement with said worm wheel throughout a major portion of its length to afford a durable and powerful drive connection, a longitudinal gear rack rigid with the underside of said table, a gear connected coaxially for rotation with said worm wheel and meshing with said gear rack, and power means for rotating said worm.

5. A drive mechanism for a table longitudinally translatable on a horizontal elongated bed comprising, in combination, a housing mounted in said bed, a worm wheel journaled in said housing for rotation on an axis extending transversely of said bed, a worm journaled in said housing and meshing with said worm wheel, two spaced parallel longitudinal gear racks rigid with the underside of said table and located at opposite sides of said worm wheel, two spaced gears connected coaxially to said worm wheel at opposite sides thereof and for rotation therewith and meshing respectively with said gear racks, and power means for rotating said worm.

6. A drive mechanism for a table longitudinally translatable on a horizontal elongated bed comprising, in combination, a housing mounted in said bed, a worm wheel journaled in said housing for rotation on an axis extending transversely of said bed, a worm journaled in said housing and meshing with said worm wheel, two spaced parallel longitudinal gear racks rigid with the underside of said table and located at opposite sides of said worm wheel, two spaced gears connected coaxially to said worm wheel at opposite sides thereof and meshing respectively with said gear racks, power means including a train of reduction gears mounted in said housing for rotating said worm, and a transverse shaft drivingly connected with said worm, said shaft projecting to opposite sides of said bed.

7. A drive mechanism for a horizontal table mounted for translation on an elongated horizontal bed comprising, in combination, two spaced parallel longitudinal gear racks rigid with the underside of said table, two coaxial gears journaled in said bed substantially midway of the ends and meshing respectively with said gear racks, and a worm and worm wheel drive disposed intermediate said gears and operative to drive the same.

8. In combination, an elongated horizontal bed formed intermediate its ends with an internal recess and with spaced parallel flanges in the top along opposite sides of said recess, a housing having opposite side flanges at the top resting on and secured to said parallel flanges whereby to suspend said housing in said recess, a worm and worm wheel drive assembly mounted in said housing, a drive shaft extending longitudinally through said bed into said housing to drive said assembly, and a double rack and pinion drive connection between said assembly and the underside of said table.

9. In combination, an elongated horizontal bed formed intermediate its ends with an internal recess and with spaced parallel flanges in the top along opposite sides of said recess, a housing having opposite side flanges at the top resting on and secured to said parallel flanges whereby to suspend said housing in said recess, a worm and worm wheel assembly mounted in said housing, a gear casing on said housing, a train of speed reduction gears connected to said worm, a drive shaft extending longitudinally through said bed into said casing to drive said train of gears, and a rack and pinion drive connection between said assembly and said table.

10. In combination, an elongated horizontal bed formed intermediate its ends with an internal recess and with spaced parallel flanges in the top along opposite sides of said recess, a housing having opposite side flanges at the top resting on and secured to said parallel flanges whereby to suspend said housing in said recess, a worm and worm wheel assembly mounted in said housing, said worm being of hourglass shape and having substantially full tooth engagement throughout a major portion of its length with said worm wheel, means for driving said worm, and a rack and pinion drive connection between said assembly and said table.

11. A drive mechanism for a table translatable on a bed comprising, in combination, a housing mounted within said bed beneath said table, a fixed shaft supported in and extending through said housing transversely of said bed, roller bearings supported in axially spaced relation on said shaft, a coaxial sleeve supported for rotation at opposite ends on said bearings, a worm wheel encircling said sleeve and secured thereto intermediate the ends of said sleeve for rotation therewith, two coaxial gears secured to opposite ends of said sleeve, two parallel gear racks rigid with the underside of said table and meshing respectively with said gears, a worm shaft journaled in said housing and extending longitudinally of said bed, a worm rigid with said worm shaft and meshing with the underside of said worm wheel, and means for rotating said worm shaft.

12. A drive mechanism for a table translatable on a bed comprising, in combination, a housing mounted within said bed beneath said table, a shaft supported in and extending through said housing transversely of said bed, roller bearings supported in axially spaced relation on said shaft, a coaxial sleeve supported for rotation on said bearings, a coaxial worm wheel rigid with said sleeve, two coaxial gears rigid with said sleeve, two parallel gear racks rigid with the underside of said table and meshing respectively with said gears, a worm shaft journaled in said housing and extending longitudinally of said bed, a worm rigid with said worm shaft and meshing with the underside of said worm wheel, and means for rotating said worm shaft.

13. A drive mechanism for a table longitudinally translatable on a horizontal elongated bed comprising, in combination, a gear drive unit mounted in said bed and operatively connected to said table to translate the latter, said unit including a drive shaft, power means connected to one end of said shaft for rotating said shaft, a transverse shaft connected through a nonlocking worm and worm wheel drive to the other end of said shaft, and extending to one side of said bed, a longitudinal shaft geared to said transverse shaft and extending along one side of said bed, a cross shaft geared to said longitudinal shaft and extending transversely through said bed, and two adjustable micrometers connected respectively to opposite ends of said cross shaft to indicate the travel of said table.

KEITH F. GALLIMORE.
GEORGE LANGEN.